United States Patent
Eliu et al.

(10) Patent No.: US 7,045,608 B2
(45) Date of Patent: May 16, 2006

(54) PROCESS FOR THE PREPARATION OF CATIONIC AZO COMPOUNDS

(75) Inventors: Victor Paul Eliu, Lörrach (DE); Julia Hauser, Grenzach-Wyhlen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/505,730

(22) PCT Filed: Feb. 20, 2003

(86) PCT No.: PCT/EP03/01732

§ 371 (c)(1),
(2), (4) Date: Aug. 25, 2004

(87) PCT Pub. No.: WO03/072657

PCT Pub. Date: Sep. 4, 2003

(65) Prior Publication Data

US 2005/0154195 A1    Jul. 14, 2005

(30) Foreign Application Priority Data

Feb. 28, 2002 (EP) ................................. 02405145

(51) Int. Cl.
*C09B 43/40* (2006.01)
(52) U.S. Cl. ...................... 534/588; 534/607; 534/608; 8/405
(58) Field of Classification Search ................ 534/588, 534/607, 608; 8/405
See application file for complete search history.

(56) References Cited

U.S. PATENT DOCUMENTS

| 3,102,878 | A | | 9/1963 | Baumann et al. ............ 260/146 |
| 4,294,756 | A | * | 10/1981 | Kuhlthau ..................... 534/607 |
| 5,708,151 | A | | 1/1998 | Möckli ......................... 534/608 |
| 5,733,343 | A | * | 3/1998 | Mockli ............................ 8/426 |
| 6,001,135 | A | * | 12/1999 | Rondeau et al. ................ 8/407 |
| 6,762,287 | B1 | * | 7/2004 | Mockli ......................... 534/607 |
| 6,843,256 | B1 | * | 1/2005 | Mockli ......................... 132/202 |

FOREIGN PATENT DOCUMENTS

| DE | 1137815 | 10/1962 |
| DE | 1151612 | 7/1963 |
| EP | 0714954 | 6/1996 |
| GB | 910121 | 11/1962 |
| WO | 95/01772 | 1/1995 |
| WO | 01/66646 | 9/2001 |
| WO | 02/31056 | 4/2002 |

OTHER PUBLICATIONS

T. Deligeorgiev et al., Dyes and Pigments, vol. 31, No. 3, pp. 219-224, (1996).

* cited by examiner

*Primary Examiner*—Fiona T. Powers
(74) *Attorney, Agent, or Firm*—Kevin T. Mansfield

(57) ABSTRACT

A process for the preparation of certain cationic azo compounds is described, as well as the use thereof for dyeing keratin-containing fibres, especially human hair, in which specific cationic azo dyes are used.

16 Claims, No Drawings

PROCESS FOR THE PREPARATION OF CATIONIC AZO COMPOUNDS

The present invention relates to a process for the preparation of certain cationic azo compounds, and to their use.

Cationic azo compounds, their preparation and their use are already known, e.g. from WO 95/01772 and EP-A-714 954.

In hitherto known syntheses of imidazole azo compounds, which are carried out at temperatures of from 40° C. to 140° C., optionally under pressure and/or under an inert gas atmosphere in an inert solvent, especially in dimethylformamide or in dimethyl sulfoxide, the synthesis conditions result in reaction masses that are thermally critical. Such reaction masses give rise to thermal decomposition which, in industrial production, leads to considerable safety problems.

It has now been found that by the selection of a suitable solvent or a solvent mixture and a basic catalyst or a mixture of basic catalysts, such as tertiary amines and/or alcoholates, the synthesis can be carried out at a lower temperature with the same or even improved reaction yield, without at the same time prolonging the reaction time. Alternatively, synthesis at the same temperature proceeds considerably more quickly.

The present invention accordingly relates to a process for the preparation of azo compounds of formula (I)

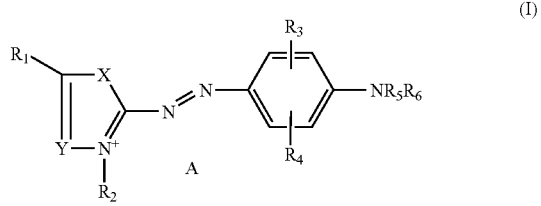

wherein

X is —O— or —NR$_7$—,

Y is —N= or —CR$_8$=,

A is a colourless anion,

R$_1$ and R$_8$ each independently of the other are hydrogen; C$_1$–C$_4$alkyl; C$_1$–C$_4$alkyl substituted by —OH, —C$_1$–C$_4$alkoxy, halogen, —CN or by phenyl; halogen or nitro, R$_2$ and R$_7$ each independently of the other are hydrogen; unsubstituted C$_1$–C$_4$alkyl or C$_1$–C$_4$alkyl substituted by —OH, C$_1$–C$_4$alkoxy, halogen, CN or by phenyl, R$_3$ and R$_4$ each independently of the other are hydrogen; unsubstituted C$_1$–C$_4$alkyl; C$_1$–C$_4$alkyl substituted by —OH, —C$_1$–C$_4$alkoxy, halogen, —CN or by phenyl; unsubstituted C$_1$–C$_{12}$alkoxy; C$_1$–C$_{12}$alkoxy substituted by —OH, —C$_1$–C$_4$alkoxy, halogen, —CN or by phenyl; or halogen, R$_5$ is hydrogen; unsubstituted C$_{1-4}$alkyl; or C$_1$–C$_4$alkyl substituted by —OH, —C$_1$–C$_4$alkoxy, halogen, —CN or by phenyl, R$_6$ is hydrogen; unsubstituted C$_{1-4}$alkyl; C$_1$–C$_4$alkyl substituted by —OH, —C$_1$–C$_4$alkoxy, halogen, —CN or by phenyl; or a radical of formula (a) or (b)

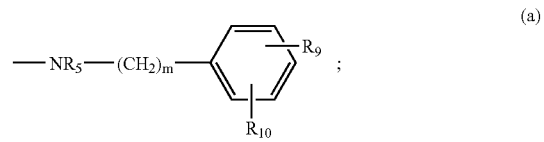

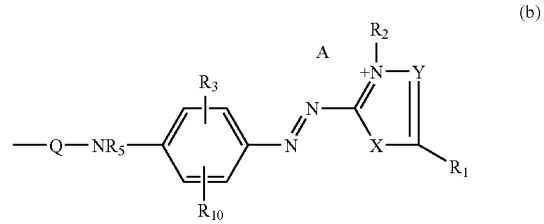

wherein

X, Y, A, R$_1$, R$_2$, R$_3$, R$_4$ and R$_5$ are as defined above, and

R$_9$ and R$_{10}$ each independently of the other are hydrogen; unsubstituted C$_1$–C$_4$-alkyl; C$_1$–C$_4$alkyl substituted by —OH, —C$_1$–C$_4$alkoxy, halogen, —CN or by phenyl; —OR$_{11}$; —NR$_{11}$R$_{12}$ or —NR$_{11}$COR$_{12}$, wherein R$_{11}$ and R$_{12}$ each independently of the other are hydrogen; —NH$_2$; unsubstituted C$_1$–C$_{12}$alkyl or C$_1$–C$_{12}$alkyl substituted by —OH, —C$_1$–C$_4$alkoxy, halogen, —CN or by phenyl, Q is a bridging member, and m is 0 or 1, or R$_5$ and R$_6$ together with the nitrogen atom to which they are bonded form a pyrrolidine, piperidine, morpholine or piperazine ring, by reaction of a compound of formula (II) or a mixture of compounds of formula (II)

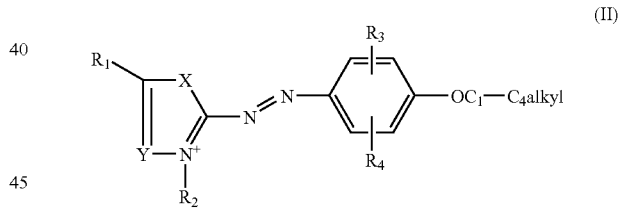

with a compound of formula (III) or with a mixture of compounds of formula (III)

wherein all the substituents are as defined above, in a solvent or solvent mixture, which process comprises adding to the reaction mixture at least one tertiary amine and/or at least one alcoholate of the formula R$_{13}$O-Z, wherein R$_{13}$ is unsubstituted C$_1$–C$_{10}$alkyl or C$_1$–C$_{10}$alkyl substituted by —OH, —C$_1$–C$_4$alkoxy, halogen, —CN or by phenyl, and Z is an alkali metal.

Alkyl radicals are to be understood according to the invention generally as being open-chain or branched alkyl radicals, for example methyl, ethyl, n- and iso-propyl and n-, sec- and tert-butyl.

Such alkyl radicals may be mono- or poly-substituted, for example by hydroxy, carboxy, halogen, cyano or $C_1$–$C_4$alkoxy.

The alkoxy radicals preferably have from 1 to 4 carbon atoms and are, for example, methoxy, ethoxy, propoxy, isopropoxy, n-butoxy, isobutoxy, tert-butoxy, n-pentyloxy and n-hexyloxy. The alkoxy groups may likewise be substituted, for example by the radicals listed as possible substituents of alkyl groups, especially by hydroxy or $C_1$–$C_4$alkoxy.

Suitable colourless anions A include inorganic and organic anions, for example halide, such as chloride, bromide or iodide, sulfate, hydrogen sulfate, methyl sulfate, boron tetrafluoride, aminosulfonate, perchlorate, carbonate, bicarbonate, phosphate, nitrate, benzenesulfonate, formate, acetate, propionate, lactate or complex anions, such as the anion of a zinc chloride double salt.

The anion is generally governed by the preparation process. Preferably, chlorides, hydrogen sulfates, sulfates, methosulfates, phosphates, formates, lactates or acetates are present.

Halogen is to be understood as being fluorine, bromine, iodine and especially chlorine.

The bridging member Q is especially an unsubstituted $C_1$–$C_{20}$alkylene group; a $C_1$–$C_{20}$alkylene group substituted by —OH, —$C_1$–$C_4$alkoxy, halogen, —CN or by phenyl; or a $C_1$–$C_{20}$alkylene group interrupted by one or more hetero atoms, such as N, O and/or S, which may be unsubstituted or substituted by the above-mentioned groups.

The process is preferred for compounds of formula (I) wherein

X is —$NR_7$—,

Y is —$CR_6$=,

A is a colourless anion, $R_1$ and $R_8$ each independently of the other are hydrogen or unsubstituted $C_1$–$C_2$alkyl, $R_2$ and $R_7$ each independently of the other are unsubstituted $C_1$–$C_2$alkyl or hydroxyethyl, $R_3$ and $R_4$ each independently of the other are hydrogen; methyl; methoxy or chlorine, $R_5$ is hydrogen; methyl or ethyl, $R_6$ is hydrogen; methyl; ethyl, or a radical of formula (a) or (b)

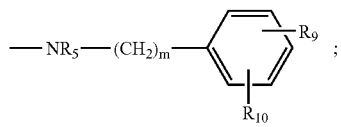

(a)

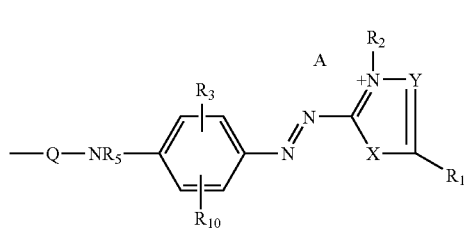

(b)

wherein X, Y, A, $R_1$, $R_2$, $R_3$, $R_4$ and $R_5$ have the preferred meanings given above, and $R_9$ and $R_{10}$ each independently of the other are hydrogen; unsubstituted $C_1$–$C_4$-alkyl; $C_1$–$C_4$alkyl substituted by —OH, —$C_1$–$C_4$alkoxy, halogen, —CN or by phenyl; —$OR_{11}$; —$NR_{11}R_{12}$ or —$NR_{11}COR_{12}$, wherein $R_{11}$ and $R_{12}$ each independently of the other are hydrogen; —$NH_2$; unsubstituted $C_1$–$C_{12}$alkyl or $C_1$–$C_{12}$alkyl substituted by —OH, —$C_1$–$C_4$alkoxy, halogen, —CN or by phenyl, Q is unsubstituted $C_2$–$C_{10}$alkylene or $C_2$–$C_{10}$alkylene substituted by —OH, —$C_1$–$C_4$alkoxy, halogen, —CN or by phenyl, and m is 0 or 1.

The process is especially preferred for compounds of formula (Ia)

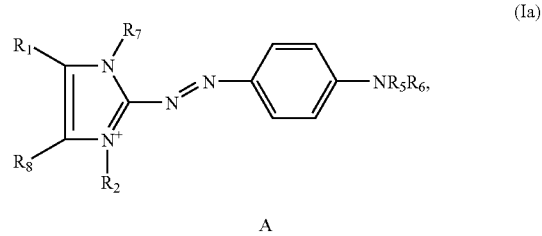

(Ia)

wherein $R_1$ and $R_8$ each independently of the other are hydrogen or methyl, $R_2$ and $R_7$ each independently of the other are methyl or ethyl, $R_5$ and $R_6$ each independently of the other are hydrogen; methyl or ethyl and A is a colourless anion.

The process is likewise especially preferred for compounds of formula (Ib)

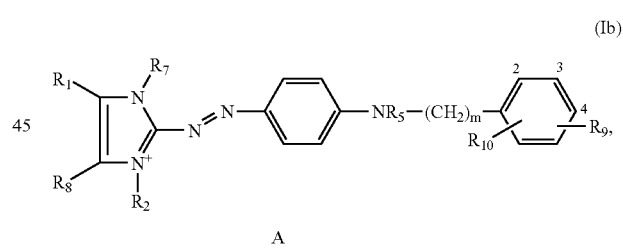

(Ib)

wherein $R_1$ and $R_8$ each independently of the other are hydrogen or methyl, $R_2$ and $R_7$ each independently of the other are methyl or ethyl, $R_5$ is hydrogen or methyl, $R_9$ is hydrogen or methyl, $R_{10}$ is hydrogen; methoxy; ethoxy; —$NH_2$; —NHCOH; —$NHCOCH_3$; —$NHCOCH_2CH_3$ or —$NHCONH_2$, $R_{10}$ preferably being in the 4-position, m is 0 or 1 and A is a colourless anion.

The process is likewise especially preferred for compounds of formula (Ic)

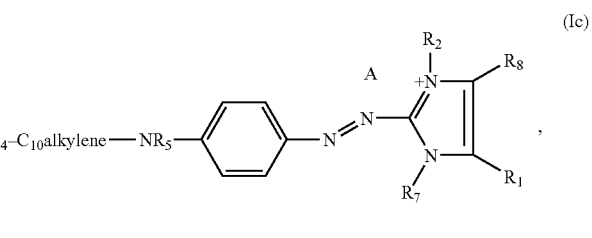

wherein $R_1$ and $R_8$ each independently of the other are hydrogen or methyl, $R_2$ and $R_7$ each independently of the other are methyl or ethyl, each $R_5$ independently of the other is hydrogen or methyl, and each A independently of the other is a colourless anion.

In the process according to the invention, from 0.5 to 200 parts, preferably from 1 to 150 parts, especially from 1 to 100 parts, of at least one tertiary amine and/or at least one alcoholate of the formula $R_{13}O\text{-}Z$, wherein $R_{13}$ and Z are as defined above, are used.

The tertiary amines may contain more than one nitrogen atom (diamines, triamines etc.). The tertiary amines may be aliphatic, aromatic or araliphatic.

The nitrogen atoms of the tertiary amines may be integrated in a ring or the amines may contain a ring.

Such suitable tertiary amines have especially one of the following formulae (c)-(i)

$NR_{14}R_{15}R_{16}$; (c)

 (d)

 (e)

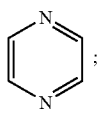 (f)

 (g)

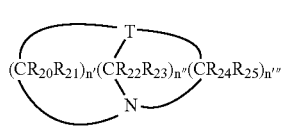 and (h)

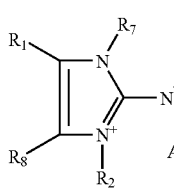 (i)

wherein $R_{14}$, $R_{15}$ and $R_{16}$ each independently of the others are unsubstituted $C_1$–$C_{10}$alkyl or $C_1$–$C_{10}$alkyl substituted by —OH, —$C_1$–$C_4$alkoxy, halogen, —CN or by phenyl, $R_{17}$ is unsubstituted $C_1$–$C_4$alkyl or $C_1$–$C_4$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl, T is N or CH, n is 4, 5 or 6 and n', n" and n'" each independently of the others are 1, 2, 3 or 4.

It is preferred to use amines or mixtures thereof wherein $R_{14}$, $R_{15}$ and $R_{16}$ each independently of the others are unsubstituted $C_1$–$C_8$alkyl or $C_1$–$C_8$alkyl substituted by —OH, —$C_1$–$C_4$alkoxy, halogen, —CN or by phenyl, $R_{17}$ is unsubstituted $C_1$–$C_2$alkyl or $C_1$–$C_2$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_2$alkyl or $C_1$–$C_2$alkyl substituted by —OH, —$C_1$–$C_4$alkoxy, halogen, —CN or by phenyl, T is N or CH, n is 5 or 6 and n', n" and n'" each independently of the others are 2 or 3.

Especially preferred amines are above all trimethylamine, triethylamine, trioctylamine, pyridine, N-methylpiperidine, quinuclidine and diaza-bicyclooctane (DABCO).

In preferred alcoholates of the formula $R_{13}O\text{-}Z$, $R_{13}$ is unsubstituted $C_1$–$C_4$alkyl or $C_1$–$C_4$alkyl substituted by —OH, —$C_1$–$C_4$alkoxy, halogen, —CN or by phenyl and Z is an alkali metal, especially sodium.

Suitable solvents for the synthesis include both protic and aprotic solvents, and any mixtures thereof.

Suitable protic solvents are especially water or aliphatic alcohols, preferably $C_1$–$C_8$alcohols such as methanol, ethanol, isopropanol, propanol, 2-propanol and butanol.

Suitable polar aprotic solvents are especially alkyl nitriles, such as acetonitrile or propionitrile; amides such as dialkylformamides, preferably di-$C_1$–$C_2$alkylformamides, or dialkylacetamides, preferably di-$C_1$–$C_2$alkylacetamides; amines from the pyrrolidone series, such as N-alkylpyrrolidones, preferably N-methylpyrrolidone; or sulfoxides, such as dimethyl sulfoxide. It is likewise possible to use mixtures of such solvents.

Especially preferred solvents are methanol, 2-propanol, 1-butanol, acetonitrile, dimethylformamide and dimethylacetamide.

The process according to the invention is preferably carried out at a temperature of from 40 to 140° C., especially from 50 to 120° C.

A preferred embodiment of the present invention is the preparation of compounds of formula (Ia)

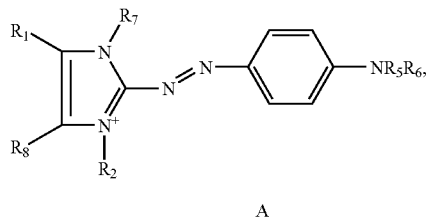

(Ia)

wherein $R_1$ and $R_8$ each independently of the other are hydrogen or methyl, $R_2$ and $R_7$ each independently of the other are methyl or ethyl, $R_5$ and $R_6$ each independently of the other are hydrogen; methyl or ethyl and A is a colourless anion, by reaction of a compound of formula (IIa) or a mixture of compounds of formula (IIa)

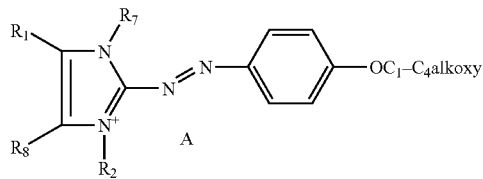

(IIa)

with a compound of formula (III) or with a mixture of compounds of formula (III)

$NHR_5R_6$ (III), wherein all the substituents have the preferred meanings given above, in a protic solvent, especially in water or in aliphatic alcohols, preferably in $C_1-C_8$alcohols such as methanol, ethanol, isopropanol, propanol, 2-propanol or butanol or in a polar aprotic solvent, especially in alkyl nitriles, such as acetonitrile or propionitrile; in amides such as dialkylformamides, preferably di-$C_1-C_2$alkylformamides, or in dialkylacetamides, preferably di-$C_1-C_2$alkylacetamides; in amines from the pyrrolidone series, such as N-alkylpyrrolidones, preferably N-methylpyrrolidone; or in sulfoxides, such as dimethyl sulfoxide, optionally under an inert atmosphere, such as a nitrogen atmosphere, at a temperature of from 40 to 140° C., preferably from 50 to 120° C., which process comprises adding from 0.5 to 200 parts, preferably from 1 to 150 parts, especially from 1 to 100 parts, of at least one amine of one of formulae (c)-(i)

$NR_{14}R_{15}R_{16}$; (c)

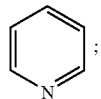

(d)

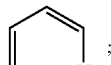

(e)

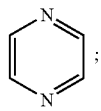

(f)

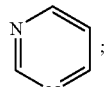

(g)

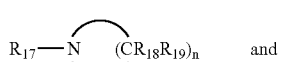

(h)

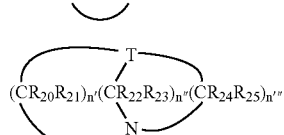

(i)

and/or at least one alcoholate of the formula $R_{13}$O-Z, wherein $R_{13}$ is unsubstituted $C_1-C_{10}$alkyl or $C_1-C_{10}$alkyl substituted by —OH, —$C_1-C_4$alkoxy, halogen, —CN or by phenyl, and Z is an alkali metal, $R_{14}$, $R_{15}$ and $R_{16}$ each independently of the others are unsubstituted $C_1-C_{10}$alkyl or $C_1-C_{10}$alkyl substituted by —OH, —$C_1-C_4$alkoxy, halogen, —CN or by phenyl, preferably unsubstituted $C_1-C_8$alkyl or $C_1-C_8$alkyl substituted by —OH, —$C_1-C_4$alkoxy, halogen, —CN or by phenyl, $R_{17}$ is unsubstituted $C_1-C_4$alkyl or $C_1-C_4$alkyl substituted by —OH, —$C_1-C_4$alkoxy, halogen, —CN or by phenyl, preferably unsubstituted $C_1-C_2$alkyl or $C_1-C_2$alkyl substituted by —OH, —$C_1-C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen; unsubstituted $C_1-C_4$alkyl or $C_1-C_4$alkyl substituted by —OH, —$C_1-C_4$alkoxy, halogen, —CN or by phenyl; preferably hydrogen, unsubstituted $C_1-C_2$alkyl or $C_1-C_2$alkyl substituted by —OH, —$C_1-C_4$alkoxy, halogen, —CN or by phenyl, T is N or CH, n is 4, 5 or 6, preferably 5 or 6, and n', n" and n''' each independently of the others are 1, 2, 3 or 4, preferably 2 or 3.

A likewise preferred embodiment of the present invention is the preparation of compounds of formula (Ib)

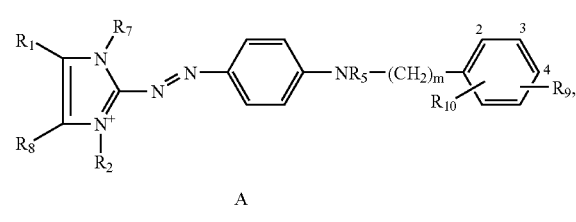

(Ib)

wherein $R_1$ and $R_8$ each independently of the other are hydrogen or methyl, $R_2$ and $R_7$ each independently of the other are methyl or ethyl, $R_5$ is hydrogen or methyl, $R_9$ is hydrogen or methyl, $R_{10}$ is hydrogen; methoxy; ethoxy; —NH$_2$; —NHCOH; —NHCOCH$_3$; —NHCOCH$_2$CH$_3$ or —NHCONH$_2$, $R_{10}$ preferably being in the 4-position, m is 0 or 1 and A is a colourless anion, by reaction of a compound of formula (IIb) or a mixture of compounds of formula (IIb)

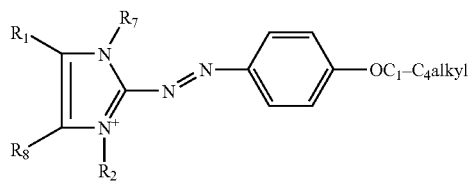

with a compound of formula (IIIb) or with a mixture of compounds of formula (IIIb)

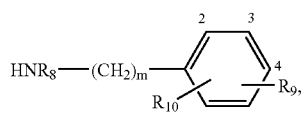

wherein all the substituents have the definitions and preferred meanings given above, in a protic solvent, especially in water or in aliphatic alcohols, preferably in $C_1$–$C_8$alcohols such as methanol, ethanol, isopropanol, propanol, 2-propanol or butanol or in a polar aprotic solvent, especially in alkyl nitrites, such as acetonitrile or propionitrile; in amides such as dialkylformamides, preferably di-$C_1$–$C_2$alkylformamides, or in dialkylacetamides, preferably di-$C_1$–$C_2$alkylacetamides; in amines from the pyrrolidone series, such as N-alkylpyrrolidones, preferably N-methylpyrrolidone; or in sulfoxides, such as dimethyl sulfoxide, optionally under an inert atmosphere, such as a nitrogen atmosphere, at a temperature of from 40 to 140° C., preferably from 50 to 120° C., which process comprises adding from 0.5 to 200 parts, preferably from 1 to 150 parts, especially from 1 to 100 parts, of at least one amine of one of formulae (c)-(i)

NR$_{14}$R$_{15}$R$_{16}$; (c)

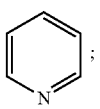 (d)

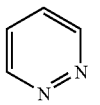 (e)

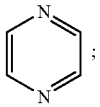 (f)

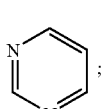 (g)

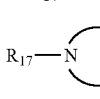 (h)

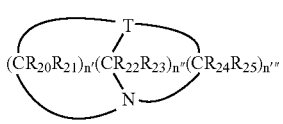 and (i)

and/or at least one alcoholate of the formula $R_{13}$O-Z, wherein $R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and Z is an alkali metal, $R_{14}$, $R_{15}$ and $R_{16}$ each independently of the others are unsubstituted $C_1$–$C_{10}$alkyl or $C_1$–$C_{10}$ substituted by —OH, —$C_1$–$C_4$alkoxy, halogen, —CN or by phenyl, preferably unsubstituted $C_1$–$C_8$alkyl or $C_1$–$C_8$alkyl substituted by —OH, —$C_1$–$C_4$alkoxy, halogen, —CN or by phenyl, $R_{17}$ is unsubstituted $C_1$–$C_4$alkyl or $C_1$–$C_4$alkyl substituted by —OH, —$C_1$–$C_4$alkoxy, halogen, —CN or by phenyl, preferably unsubstituted $C_1$–$C_2$alkyl or $C_1$–$C_2$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl; preferably hydrogen, unsubstituted $C_1$–$C_2$alkyl or $C_1$–$C_2$alkyl substituted by —OH, —$C_1$–$C_4$alkoxy, halogen, —CN or by phenyl, T is N or CH, n is 4, 5 or 6, preferably 5 or 6, and n', n" and n'" each independently of the others are 1, 2, 3 or 4, preferably 2 or 3.

A likewise preferred embodiment of the present invention is the preparation of compounds of formula (Ic)

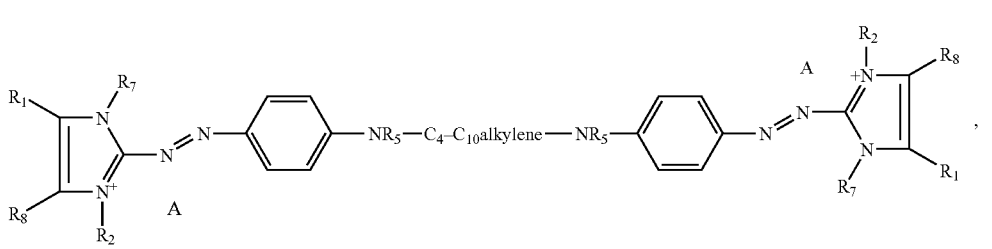

wherein
$R_1$ and $R_8$ each independently of the other are hydrogen or methyl,
$R_2$ and $R_7$ each independently of the other are methyl or ethyl,
each $R_5$ independently of the other is hydrogen or methyl,
each A independently of the other is a colourless anion.
by reaction of a compound of formula (IIc) or a mixture of compounds of formula (IIc)

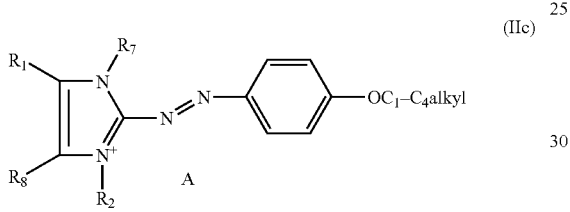

with a compound of formula (IIIc) or with a mixture of compounds of formula (IIIc)

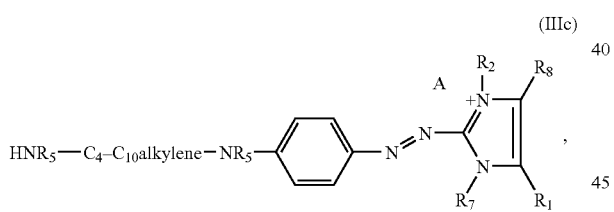

wherein all the substituents have the definitions and preferred meanings given above,
in a protic solvent, especially in water or in aliphatic alcohols, preferably in $C_1$–$C_8$alcohols such as methanol, ethanol, isopropanol, propanol, 2-propanol or butanol or
in a polar aprotic solvent, especially in alkyl nitriles, such as acetonitrile or propionitrile; in amides such as dialkylformamides, preferably di-$C_1$–$C_2$alkylformamides, or in dialkylacetamides, preferably di-$C_1$–$C_2$alkylacetamides; in amines from the pyrrolidone series, such as N-alkylpyrrolidones, preferably N-methylpyrrolidone; or in sulfoxides, such as dimethyl sulfoxide,
optionally under an inert atmosphere, such as a nitrogen atmosphere,
at a temperature of from 40 to 140° C., preferably from 50 to 120° C.,
which process comprises adding from 0.5 to 200 parts, preferably from 1 to 150 parts, especially from 1 to 100 parts, of at least one amine of one of formulae (c)-(i),

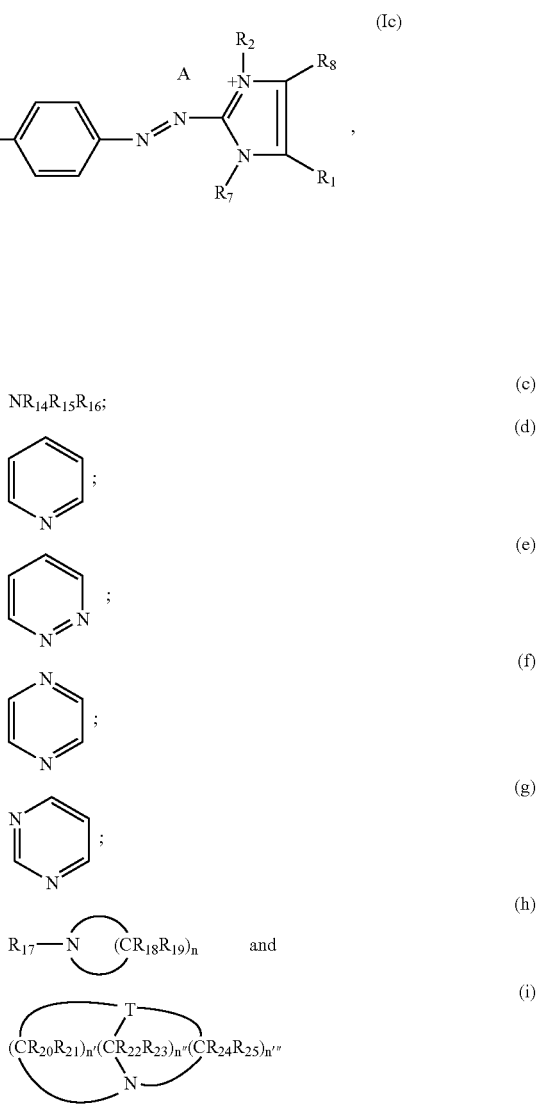

and/or at least one alcoholate of the formula $R_{13}$O-Z,
wherein
$R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and
Z is an alkali metal,
$R_{14}$, $R_{15}$ and $R_{16}$ each independently of the others are unsubstituted $C_1$–$C_{10}$alkyl or $C_1$–$C_{10}$alkyl substituted by —OH, —$C_1$–$C_4$alkoxy, halogen, —CN or by phenyl, preferably unsubstituted $C_1$–$C_8$alkyl or $C_1$–$C_8$alkyl substituted by —OH, —$C_1$–$C_4$alkoxy, halogen, —CN or by phenyl,
$R_{17}$ is unsubstituted $C_1$–$C_4$alkyl or $C_1$–$C_4$alkyl substituted by —OH, —$C_1$–$C_4$alkoxy, halogen, —CN or by phenyl, preferably unsubstituted $C_1$–$C_2$alkyl or $C_1$–$C_2$alkyl substituted by —OH, —$C_1$–$C_4$alkoxy, halogen, —CN or by phenyl,
$R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl; preferably hydrogen, unsubstituted $C_1$–$C_2$alkyl or $C_1$–$C_2$alkyl substituted by —OH, —$C_1$–$C_4$alkoxy, halogen, —CN or by phenyl, T is N or CH, n is 4, 5 or 6, preferably 5 or 6, and n', n" and n'" each independently of the others are 1, 2, 3 or 4, preferably 2 or 3.

The azo compounds prepared by the preparation process according to the invention are suitable for dyeing materials customarily dyed using cationic dyes, for example polyacrylonitrile, wood pulp and hair, especially living human hair.

The invention relates also to compositions for dyeing keratin-containing material, which compositions comprise the dyes prepared according to the invention.

The compounds of formula (I) prepared according to the invention are present in the compositions according to the invention preferably in an amount of from 0.001% to 5%, especially from 0.01% to 1%, based on the total dyeing composition.

The range of shades and the colour fastness of the dyes of formula (I) used according to the invention can be extended by combination with other dyes used in the field of hair-dyeing compositions. They can very readily be combined with oxidation dyes and with direct dyes, it being possible for the latter to be of cationic nature or uncharged. Solely in the case of anionic direct dyes is a degree of caution advisable, because in that case precipitation in the formulation may occur under certain circumstances.

In all dyeing compositions it is also possible for a plurality of different colouring substances to be used together; likewise, it is also possible for a plurality of different oxidation dye precursors from the group of developer and coupler compounds to be used together, for example aromatic compounds having a primary or secondary amino group, nitrogen-containing heterocycles, aromatic hydroxy compounds or amino acids, as described, for example, in German Patent Application DE-A1-197 17 224.

In a further embodiment, in addition to comprising the dyes of formula (I) according to the invention the dyeing compositions according to the invention may, for the purpose of further modification of colour shades, also comprise customary direct dyes, for example from the group of the nitroanilines, nitrophenylenediamines, nitroaminophenols, anthraquinones, indophenols, phenazines, phenothiazines, methines and the compounds known as Arianors, for example the compounds known by the international denominations or trade names HC Yellow 2, HC Yellow 4, HC Yellow 6, Basic Yellow 57, Basic Yellow 9, Disperse Orange 3, HC Red 3, HC Red BN, Basic Red 76, Basic Red 2, Basic Violet 14, Basic Blue 3, Basic Blue 6, Basic Blue 7, Basic Blue 9, Basic Blue 12, Basic Blue 26, HC Blue 2, HC Blue 7, HC Blue 12, Disperse Blue 3, Basic Blue 99, HC Violet 1, Disperse Violet 1, Disperse Violet 4, Disperse Black 9, Basic Brown 16 and Basic Brown 17, and picramic acid, 2-amino-6-chloro-4-nitrophenol, 4-amino-2-nitrodiphenylamine-2'-carboxylic acid, 6-nitro-1,2,3,4-tetrahydroquinoxaline, 4-N-ethyl-1,4-bis(2'-hydroxyethylamino)-2-nitrobenzene hydrochloride and 1-methyl-3-nitro-4-(2'-hydroxyethyl)-aminobenzene.

Also very suitable for combination with the dyes prepared according to the invention are cationised nitroaniline and anthraquinone dyes, for example those described in the following Patent Specifications: U.S. Pat. Nos. 5,298,029, 5,360,930, 5,169,403, 5,256,823, 5,135,543, EP-A-818 193, U.S. Pat. No. 5,486,629 and EP-A-758 547.

Also readily capable of combination are cationic azo dyes, for example according to GB-A-2 319 776, and the oxazine dyes described in DE-A-299 12 327 and mixtures thereof with the further direct dyes indicated therein.

The compositions of the invention according to that embodiment contain the dyes preferably in an amount of from 0.01 to 5% by weight, based on the total dyeing composition.

Furthermore, the dyeing compositions according to the invention may also comprise naturally occurring dyes, for example henna red, henna neutral, henna black, camomile blossom, sandalwood, black tea, Rhamnus frangula bark, sage, campeche wood, madder root, catechu, sedre and alkanet root. Suitable dyeing methods are described, for example, in EP-A-404 868.

In respect of further customary dye components, reference is made expressly to the series "Dermatology", edited by Ch. Culnan, H. Maibach, Verlag Marcel Dekker Inc., New York, Basle, 1986, Vol. 7, Ch. Zviak, The Science of Hair Care, chapter 7, pages 248–250 (direct dyes), and chapter 8, pages 264–267 (oxidation dyes), and to "Europäisches Inventar der Kosmetikrohstoffe", 1996, published by The European Commission, obtainable in diskette form from the Bundesverband der deutschen Industrie- und Handelsunternehmen für Arzneimittel, Reformwaren und Körperpflegemittel e.V., Mannheim.

It is not necessary for the oxidation dye precursors, where present, or for the dyes each to be single compounds, but rather the dyeing compositions according to the invention may additionally comprise, depending on the preparation procedures for the individual dyes, lesser amounts of further components, provided such components do not have an adverse effect on the dyeing result or do not need to be excluded for other reasons, for example on toxicological grounds.

The dyes of formula (I) according to the invention may also readily be used in combination with other dyes and/or adjuvants used in the dyeing of hair, for example with oxidising agents for achieving lightened dyeings, as described in EP-A-810 851, oxidising agents in the form of permanent-wave fixing solutions, as described in DE-A-197 13 698 or WO 99/40895, oxidation dyeing compositions, as described in EP-A-850 636, EP-A-850 637, EP-A-850 638 and EP-A-852 135, oxidation dyeing compositions containing cationic couplers, as described in WO 99/48856 and WO 99/48875, oxidation dyes in the presence of oxidoreductase enzyme, as described in WO 99/17730 and WO 99/36034, autooxidisable oxidation dyes, as described in WO 99/20234, nitrobenzene derivatives, as described in WO 99/20235, polyols or polyethers, as described in EP-A-962 219, thickening polymers, as described in EP-A-970 684, sugar-containing polymers, as described in EP-A-970 687, quaternary ammonium salts, as described in WO 00/10517, anionic surfactants, as described in WO 00/10518, non-ionic surfactants, as described in WO 00/10519 or silicones, as described in WO 00/12057.

The dyeing compositions according to the invention produce intense dyeings even at physiologically tolerable temperatures of less than 45° C. They are accordingly suitable especially for dyeing human hair. For use on human hair, the dyeing compositions can usually be incorporated into an aqueous cosmetic carrier. Suitable aqueous cosmetic carriers include, for example, creams, emulsions, gels and also surfactant-containing foaming solutions, e.g. shampoos or other preparations, that are suitable for use on keratin-containing fibres. Such modes of application are described in detail in Research Disclosure 42448 (August 1999). If necessary, it is also possible to incorporate the dyeing compositions into anhydrous carriers, as described, for example, in U.S. Pat. No. 3,369,970. The dyeing compositions according to the invention are also outstandingly suitable for the dyeing method described in DE-A-3 829 870 using a dyeing comb or dyeing brush.

The dyeing compositions according to the invention may furthermore comprise any active ingredient, additive or adjuvant known for such preparations. The dyeing compositions in many cases comprise at least one surfactant, there being suitable in principle anionic and also zwitterionic, ampholytic, non-ionic and cationic surfactants. In many cases, however, it has proved advantageous to select the surfactants from anionic, zwitterionic and non-ionic surfactants.

Anionic surfactants suitable for use in preparations according to the invention include any anionic surface-active substance that is suitable for use on the human body. Such a substance is characterised by an anionic group that imparts water solubility, for example a carboxylate, sulfate, sulfonate or phosphate group, and a lipophilic alkyl group having approximately from 10 to 22 carbon atoms. In addition, glycol or polyglycol ether groups, ester, ether and amide groups and also hydroxy groups may be present in the molecule. Examples of suitable anionic surfactants, each in the form of sodium, potassium or ammonium salts or mono-, di- or tri-alkanolammonium salts having 2 or 3 carbon atoms in the alkanol group, are:

linear fatty acids having from 10 to 22 carbon atoms (soaps),
ether carboxylic acids of formula $R-O-(CH_2-CH_2-O)_x-CH_2-COOH$, in which R is a linear alkyl group having from 10 to 22 carbon atoms and x=0 or from 1 to 16,
acyl sarcosides having from 10 to 18 carbon atoms in the acyl group,
acyl taurides having from 10 to 18 carbon atoms in the acyl group,
acyl isothionates having from 10 to 18 carbon atoms in the acyl group,
sulfosuccinic acid mono- and di-alkyl esters having from 8 to 18 carbon atoms in the alkyl group and sulfosuccinic acid monoalkylpolyoxyethyl esters having from 8 to 18 carbon atoms in the alkyl group and from 1 to 6 oxyethyl groups,
linear alkanesulfonates having from 12 to 18 carbon atoms,
linear α-olefin sulfonates having from 12 to 18 carbon atoms,
α-sulfo fatty acid methyl esters of fatty acids having from 12 to 18 carbon atoms,
alkyl sulfates and alkyl polyglycol ether sulfates of formula $R'-O(CH_2-CH_2-O)_{x'}-SO_3H$, in which R' is a preferably linear alkyl group having from 10 to 18 carbon atoms and x'=0 or from 1 to 12,
mixtures of surface-active hydroxysulfonates according to DE-A-37 25 030,
sulfated hydroxyalkylpolyethylene and/or hydroxyalkylenepropylene glycol ethers according to DE-A-37 23 354,
sulfonates of unsaturated fatty acids having from 12 to 24 carbon atoms and from 1 to 6 double bonds according to DE-A-39 26 344,
esters of tartaric acid and citric acid with alcohols that are addition products of approximately from 2 to 15 molecules of ethylene oxide and/or propylene oxide with fatty alcohols having from 8 to 22 carbon atoms.

Preferred anionic surfactants are alkyl sulfates, alkyl polyglycol ether sulfates and ether carboxylic acids having from 10 to 18 carbon atoms in the alkyl group and up to 12 glycol ether groups in the molecule, and also especially salts of saturated and especially unsaturated $C_8$–$C_{22}$carboxylic acids, such as oleic acid, stearic acid, isostearic acid and palmitic acid.

The term "zwitterionic surfactants" denotes surface-active compounds that carry at least one quaternary ammonium group and at least one $—COO^{(-)}$ or $—SO_3^{(-)}$ group in the molecule. Zwitterionic surfactants that are especially suitable are the so-called betaines, such as the N-alkyl-N,N-dimethylammonium glycinates, for example cocoalkyldimethylammonium glycinate, N-acylaminopropyl-N,N-dimethylammonium glycinates, for example cocoacylaminopropyldimethylammonium glycinate, and 2-alkyl-3-carboxymethyl-3-hydroxyethylimidazolines each having from 8 to 18 carbon atoms in the alkyl or acyl group and also cocoacylaminoethylhydroxyethylcarboxymethyl glycinate. A preferred zwitterionic surfactant is the fatty acid amide derivative known by the CTFA name cocamidopropyl betaine.

Ampholytic surfactants are to be understood as meaning surface-active compounds that, in addition to containing a $C_8$–$C_{18}$-alkyl or -acyl group, contain at least one free amino group and at least one —COOH or —$SO_3H$ group in the molecule and are capable of forming internal salts. Examples of suitable ampholytic surfactants include N-alkylglycines, N-alkylpropionic acids, N-alkylaminobutyric acids, N-alkyliminodipropionic acids, N-hydroxyethyl-N-alkyl-amidopropylglycines, N-alkyltaurines, N-alkylsarcosines, 2-alkylaminopropionic acids and alkylaminoacetic acids, each having approximately from 8 to 18 carbon atoms in the alkyl group. Especially preferred ampholytic surfactants are N-cocoalkylaminopropionate, cocoacylaminoethylaminopropionate and $C_{12}$–$C_{18}$acylsarcosine.

Non-ionic surfactants contain as the hydrophilic group, for example, a polyol group, a polyalkylene glycol ether group or a combination of polyol and polyglycol ether groups.

Such compounds are, for example:
addition products of from 2 to 30 mol of ethylene oxide and/or from 0 to 5 mol of propylene oxide with linear fatty alcohols having from 8 to 22 carbon atoms, with fatty acids having from 12 to 22 carbon atoms and with alkylphenols having from 8 to 15 carbon atoms in the alkyl group,
$C_{12}$–$C_{22}$ fatty acid mono- and di-esters of addition products of from 1 to 30 mol of ethylene oxide with glycerol,
$C_8$–$C_{22}$alkyl-mono- and -oligo-glycosides and ethoxylated analogues thereof,
addition products of from 5 to 60 mol of ethylene oxide with castor oil and hydrogenated castor oil,
addition products of ethylene oxide with sorbitan fatty acid esters,
addition products of ethylene oxide with fatty acid alkanolamides.

Examples of cationic surfactants suitable for use in the hair treatment preparations according to the invention are especially quaternary ammonium compounds. Preference is given to ammonium halides, such as alkyltrimethylammonium chlorides, dialkyldimethylammonium chlorides and trialkylmethylammonium chlorides, e.g. cetyltrimethylammonium chloride, stearyltrimethylammonium chloride, distearyldimethylammonium chloride, lauryldimethylammonium chloride, lauryldimethylbenzylammonium chloride and tricetylmethylammonium chloride. Further cationic surfactants suitable for use according to the invention are the quaternised protein hydrolysates.

Also suitable according to the invention are cationic silicone oils, for example the commercially available products Q2-7224 (manufacturer: Dow Corning; a stabilised trimethylsilylamodimethicone), Dow Corning 929 Emulsion (comprising a hydroxylamino-modified silicone, also known as amodimethicone), SM-2059 (manufacturer: General Electric), SLM-55067 (manufacturer: Wacker) and Abil®-Quat 3270 and 3272 (manufacturer: Th. Goldschmidt; diquaternary polydimethylsiloxanes, Quaternium-80).

Alkylamidoamines, especially fatty acid amidoamines, such as the stearylamidopropyldimethylamine obtainable under the name Tego Amid® 18, are distinguished especially by their good biodegradability, in addition to their good conditioning action.

Likewise highly biodegradable are quaternary ester compounds, so-called "esterquats", such as the methylhydroxyalkyldialkoyloxyalkylammonium methosulfates sold under the trade mark Stepantex®.

An example of a quaternary sugar derivative that can be used as a cationic surfactant is the commercial product Glucquat®100, according to CTFA nomenclature a "lauryl methyl gluceth-10 hydroxypropyl dimonium chloride".

The alkyl-group-containing compounds used as surfactants may be single substances, but it is usually preferred to use natural raw materials of vegetable or animal origin as starting materials in the preparation of such substances, with the result that the substance mixtures obtained have different alkyl chain lengths according to the particular raw material used.

The surfactants that are addition products of ethylene oxide and/or propylene oxide with fatty alcohols or are derivatives of such addition products may either be products having a "normal" homologue distribution or products having a restricted homologue distribution. "Normal" homologue distribution is to be understood as meaning mixtures of homologues obtained in the reaction of fatty alcohol and alkylene oxide using alkali metals, alkali metal hydroxides or alkali metal alcoholates as catalysts. Restricted homologue distributions, on the other hand, are obtained when, for example, hydrotalcites, alkali metal salts of ether carboxylic acids, or alkali metal oxides, hydroxides or alcoholates are used as catalysts. The use of products having restricted homologue distribution may be preferred.

Examples of further active ingredients, adjuvants and additives are:

non-ionic polymers, for example vinylpyrrolidone/vinyl acrylate copolymers, polyvinylpyrrolidone and vinylpyrrolidone/vinyl acetate copolymers and polysiloxanes, cationic polymers, such as quaternised cellulose ethers, polysiloxanes having quaternary groups, dimethyldiallylammonium chloride polymers, copolymers of dimethyldiallylammonium chloride and acrylic acid that are commercially available under the name Merquat® 280 and the use of which in hair-dyeing is described, for example, in DE-A 4 421 031 or EP-A-953 334, acrylamide/dimethyldiallylammonium chloride copolymers, dimethylaminoethyl methacrylate/vinylpyrrolidone copolymers quaternised with diethyl sulfate, vinylpyrrolidone/imidazolinium methochloride copolymers, quaternised polyvinyl alcohol, zwitterionic and amphoteric polymers, for example acrylamidopropyl-trimethylammonium chloride/acrylate copolymers and octylacrylamide/methyl methacrylate/tert-butylaminoethyl methacrylate/2-hydroxypropyl methacrylate copolymers, anionic polymers, for example polyacrylic acids, crosslinked polyacrylic acids, vinyl acetate/crotonic acid copolymers, vinylpyrrolidone/vinyl acrylate copolymers, vinyl acetate/butyl maleate/isobornyl acrylate copolymers, methyl vinyl ether/maleic anhydride copolymers and acrylic acid/ethyl acrylate/N-tert-butylacrylamide terpolymers, thickeners, such as agar, guar gum, alginates, xanthan gum, gum arabic, karaya gum, locust bean flour, linseed gums, dextrans, cellulose derivatives, e.g. methyl cellulose, hydroxyalkyl cellulose and carboxymethyl cellulose, starch fractions and derivatives, such as amylose, amylopectin and dextrins, clays, e.g. bentonite, or fully synthetic hydrocolloids such as, for example, polyvinyl alcohol, structuring agents, such as glucose and maleic acid, hair-conditioning compounds, such as phospholipids, for example soya lecithin, egg lecithin and cephalins, silicone oils, and also conditioning compounds, for example such as those described in DE-A-1 97 29 080, EP-A-834 303 or EP-A-312 343, protein hydrolysates, especially elastin, collagen, keratin, milk protein, soya protein and wheat protein hydrolysates, condensation products thereof with fatty acids and also quaternised protein hydrolysates, perfume oils, dimethyl isosorbitol and cyclodextrins, solubilisers, such as ethanol, isopropanol, ethylene glycol, propylene glycol, glycerol and diethylene glycol, anti-dandruff active ingredients, such as piroctone, olamines and Zinc Omadine, further substances for adjusting the pH, active ingredients such as panthenol, pantothenic acid, allantoin, pyrrolidonecarboxylic acids and salts thereof, plant extracts and vitamins, cholesterol, light stabilisers and UV absorbers, as described, for example, in EP-A-819 422, consistency regulators, such as sugar esters, polyol esters or polyol alkyl ethers, fats and waxes, such as spermaceti, beeswax, montan wax, paraffins, fatty alcohols and fatty acid esters, fatty acid alkanolamides, polyethylene glycols and polypropylene glycols having a molecular weight of from 150 to 50 000, for example such as those described in EP-A-801 942, complexing agents, such as EDTA, NTA and phosphonic acids, swelling and penetration substances, such as polyols and polyol ethers, as listed extensively, for example, in EP-A-962 219, for example glycerol, propylene glycol, propylene glycol monoethyl ether, butyl glycol, benzyl alcohol, carbonates, hydrogen carbonates, guanidines, ureas and also primary, secondary and tertiary phosphates, imidazoles, tannins, pyrrole, opacifiers, such as latex, pearlising agents, such as ethylene glycol mono- and di-stearate, propellants, such as propane-butane mixtures, N₂O, dimethyl ether, CO₂ and air, and also antioxidants.

The constituents of the aqueous carrier are used in the preparation of the dyeing compositions according to the invention in the amounts customary for that purpose; for example emulsifiers are used in concentrations of from 0.5 to 30% by weight and thickeners in concentrations of from 0.1 to 25% by weight of the total dyeing composition.

The pH of the ready-to-use dyeing compositions is usually from 2 to 11, preferably from 5 to 10.

For dyeing keratin-containing fibres, especially for dyeing human hair, the dyeing compositions, generally in the form of the aqueous cosmetic carrier, are applied to the hair in an amount of from 50 to 100 g, are left on the hair for approximately 30 minutes and are then rinsed off or washed off with a commercially available hair shampoo.

The compounds used in accordance with the invention and, where used, the oxidation dye precursors may be applied to the keratin-containing fibres either simultaneously or successively, the order in which they are applied being unimportant.

The compounds used in accordance with the invention and, where used, the oxidation dye precursors of the compositions according to the invention may be stored either separately or together, either in a liquid to paste-like preparation (aqueous or non-aqueous) or in the form of a dry powder. When the components are stored together in a liquid preparation, the preparation should be substantially anhydrous in order to reduce reaction of the components. When they are stored separately, the reactive components are intimately mixed with one another only immediately before use. In the case of dry storage, before use usually a defined amount of hot water (from 50 to 80° C.) is added and a homogeneous mixture prepared.

The following Examples serve to illustrate the invention but the scope of the invention is not limited thereto. The temperature is given in degrees Celsius. Parts and percentages relate to weight, unless otherwise indicated.

EXAMPLE 1

Comparison Test 45 g of dimethylformamide are introduced into a vessel and, under nitrogen, 54 g of 4-anisidine are dissolved therein. Then, at room temperature, 50 g of 1,3-dimethyl-2-(4'-methoxyphenylazo)-imidazole, having a titre of about 85%, are added. With stirring, a viscous mass is formed, which is heated to a temperature of 92° C. After 3 hours a further 54 g of 1,3-dimethyl-2-(4'-methoxyphenylazo)-imidazole are added. The relatively fluid mass is stirred under nitrogen at an internal temperature of 92° C. for 45 hours. The conversion is 85%.

Then in the course of 1.5 hours, without heating, 170 g of dimethylformamide are added, the temperature falling to about 60° C. When the addition is complete, the mixture is cooled to 25° C. in the course of 4 hours. The highly fluid suspension is separated by suction filtration. The filtration residue is thoroughly drained under suction and washed with dimethylformamide and then purified.

About 78 g of the product of formula (IV)

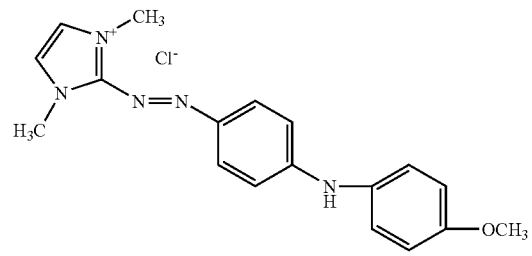

(IV)

are obtained, in a yield of 63% calculated on the basis of the amount of starting material used.

EXAMPLE 2

The procedure is similar to that in Example 1. 10 g of triethylamine are additionally added to the reaction mass as catalyst. After the same reaction time of 45 hours, but at 80° C., a conversion of 95% is ascertained. Working-up is carried out in identical manner, there being obtained a yield of 88.6 g of the product of formula (IV), that is to say 71.6% calculated on the basis of the amount of starting material used.

EXAMPLE 3

The procedure is similar to that in Example 1. 2 g of di-aza-bicyclooctane (DABCO) are added to the reaction mass as catalyst. After the same reaction time of 45 hours, but at 80° C., the conversion is virtually quantitative. Working-up is carried out in identical manner, there being obtained a yield of 107 g of the product of formula (IV), that is to say 86.6% calculated on the basis of the amount of starting material used.

EXAMPLE 4

50 g of dimethylacetamide are introduced into a vessel and, under nitrogen, 54 g of 4-anisidine are dissolved therein. Then, at room temperature, 50 g of 1,3-dimethyl-2-(4'-methoxyphenylazo)-imidazole, having a titre of about 85%, and 10 g of triethylamine as catalyst are added. With stirring, a viscous mass is formed, which is heated to a temperature of 80° C. After 3 hours a further 54 g of 1,3-dimethyl-2-(4'-methoxyphenylazo)-imidazole are added. The relatively fluid mass is stirred under nitrogen at an internal temperature of 92° C. for 20 hours. The conversion is 95%.

Then in the course of 1.5 hours, without heating, 170 g of dimethylacetamide are added, the temperature falling to about 60° C. When the addition is complete, the mixture is cooled to 25° C. in the course of 4 hours. The highly fluid suspension is separated by suction filtration, the filtration residue is thoroughly drained under suction and washed with 45 ml of dimethylacetamide and then purified.

About 74.6 g of the product of formula (IV) are obtained, in a yield of 60% calculated on the basis of the amount of starting material used.

EXAMPLE 5

Comparison Test 200 g of 2-propanol are introduced into a vessel and, under nitrogen, 52 g of 1,4-phenylenediamine are dissolved therein. Then, at room temperature, 50 g of 1,3-dimethyl-2-(4'-methoxyphenylazo)-imidazole, having a titre of about 85%, are added. With stirring, a viscous mass is formed, which is heated under reflux to a temperature of 80° C. After 3 hours a further 54 g of 1,3-dimethyl-2-(4'-methoxyphenylazo)-imidazole are added. The relatively fluid mass is stirred under nitrogen at an internal temperature of 90° C. for a further 34 hours. The conversion is 70%.

At the end of the reaction time, the mixture is cooled to 25° C. in the course of 4 hours. The highly fluid suspension is separated by suction filtration, the filtration residue is thoroughly drained under suction and washed with 45 ml of 2-propanol and then purified.

About 77 g of the product of formula (V)

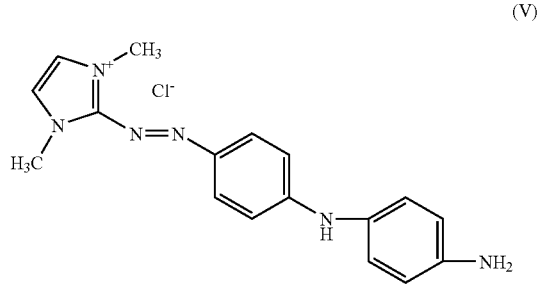

(V)

are obtained, in a yield of 63% calculated on the basis of the amount of starting material used.

EXAMPLE 6

The procedure is similar to that in Example 5. 4 g of DABCO are added to the reaction mass as catalyst. After a reaction time of 15 hours, a conversion of 95% is ascertained. Working-up is carried out in identical manner, there being obtained a yield of 89 g of the product, that is to say 72% calculated on the basis of the amount of starting material used.

EXAMPLE 7

145 g of 1-butanol are introduced into a vessel and, under nitrogen, 64 g of 4-acetamidoaniline are dissolved therein. Then, at room temperature, 4 g (36 parts) of DABCO as catalyst and 50 g of 1,3-dimethyl-2-(4'-methoxyphenylazo)-imidazole, having a titre of about 85%, are added. With stirring, a viscous mass is formed, which is heated to a temperature of 90° C. After 3 hours a further 54 g of 1,3-dimethyl-2-(4'-methoxyphenylazo)-imidazole are added. The relatively fluid mass is stirred under nitrogen at an internal temperature of 92° C. for 25 hours. The conversion is 95%.

Then in the course of 1.5 hours, without heating, 170 g of 1-butanol are added, the temperature falling to about 60° C. When the addition is complete, the mixture is cooled to 25° C. in the course of 4 hours. The highly fluid suspension is separated by suction filtration, the filtration residue is thoroughly drained under suction and washed with 45 ml of 1-butanol and then purified.

About 108 g of the product of formula (VI)

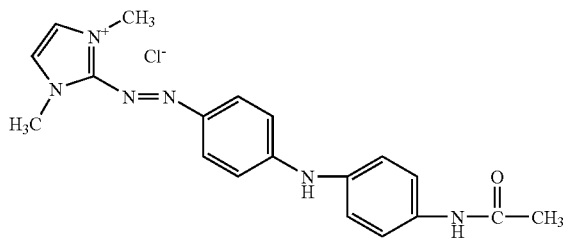

(VI)

are obtained, in a yield of 83% calculated on the basis of the amount of starting material used.

EXAMPLE 8

Comparison Test

The procedure is similar to that in Example 7, but no catalyst is added to the reaction mass. After a reaction time of 45 hours, a conversion of 70% is ascertained. Working-up is carried out in identical manner, there being obtained a yield of 78.3 g of the product of formula (VI), that is to say 60% calculated on the basis of the amount of starting material used.

EXAMPLE 9

50 g of acetonitrile are introduced into a vessel and, under nitrogen, 54 g of 4-anisidine are dissolved therein. Then, at room temperature, 50 g of 1,3-dimethyl-2-(4'-methoxyphenylazo)-imidazole, having a titre of about 85%, and 2 g of DABCO as catalyst are added. With stirring, a viscous mass is formed, which is heated to the boiling temperature of 85° C. After a further 3 hours a further 54 g of 1,3-dimethyl-2-(4'-methoxyphenylazo)-imidazole are added. The relatively fluid mass is stirred under nitrogen at an internal temperature of 80–85° C. for a further 45 hours. The conversion is 90%.

Then in the course of 1.5 hours, without heating, 170 g of acetonitrile are added, the temperature falling to about 60° C. When the addition is complete, the mixture is cooled to 25° C. in the course of 4 hours. The highly fluid suspension is separated by suction filtration, the filtration residue is thoroughly drained under suction and washed with 45 ml of acetonitrile and then purified.

About 86.8 g of the product of formula (IV) are obtained, in a yield of 70% calculated on the basis of the amount of starting material used.

EXAMPLE 10

Comparison Test

The procedure is similar to that in Example 9, but no catalyst is added to the reaction mass. After a reaction time of 45 hours, the conversion is 60%. Working-up is carried out in identical manner, there being obtained a yield of 62 g of the product of formula (IV), that is to say 50% calculated on the basis of the amount of starting material used.

EXAMPLE 11

50 g of acetonitrile are introduced into a vessel and, under nitrogen, 65 g of 4-formamidoaniline are dissolved therein. Then, at room temperature, 104 g of 1,3-dimethyl-2-(4'-methoxyphenylazo)-imidazole, having a titre of about 85%, and 2 g of DABCO are added. With stirring, a viscous mass is formed, which is heated to the boiling temperature of 85° C. The relatively fluid mass is stirred under nitrogen at an internal temperature of 80–85° C. for a further 15 hours. The conversion is 90%.

Then in the course of 1.5 hours, without heating, 170 g of acetonitrile are added, the temperature falling to about 60° C. When the addition is complete, the mixture is cooled to 25° C. in the course of 4 hours. The highly fluid suspension is separated by suction filtration, the filtration residue is thoroughly drained under suction and washed with 45 ml of acetonitrile and drained under suction.

The moist filtration residue is slurried in 300 ml of water and stirred at 80° C. for 3 hours. The slurry is then cooled to room temperature and separated by suction filtration. The filtration residue is washed with 100 ml of a 3% salt solution, thoroughly drained under suction and then dried. About 96.8 g of the product of formula (VII)

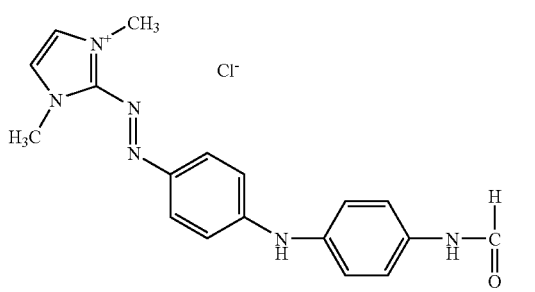

are obtained, in a yield of 75% calculated on the basis of the amount of starting material used.

EXAMPLE 12

100 g of acetonitrile are introduced into a vessel and, under nitrogen, 58 g of benzylamine are dissolved therein. Then, at room temperature, 104 g of 1,3-dimethyl-2-(4'-methoxyphenylazo)-imidazole, having a titre of about 85%, and 2 g of DABCO are added. With stirring, a viscous mass is formed, which is heated to the boiling temperature of 65° C. The relatively fluid mass is stirred under nitrogen at an internal temperature of 60–65° C. for a further 10 hours. The conversion is about 95%.

Then in the course of 1.5 hours, without heating, 70 g of acetonitrile are poured in, the temperature falling to about 50° C. When the addition is complete, the mixture is cooled to 25° C. in the course of 4 hours. The highly fluid suspension is separated by suction filtration, the filtration residue is thoroughly drained under suction and washed with 45 ml of acetonitrile and drained under suction.

The moist filtration residue is slurried in 300 ml of water and stirred at 70° C. for 3 hours. The slurry is then cooled to room temperature and separated by suction filtration. The filtration residue is washed with 100 ml of a 3% salt solution, thoroughly drained under suction and then dried. About 86.8 g of the product of formula (VII)

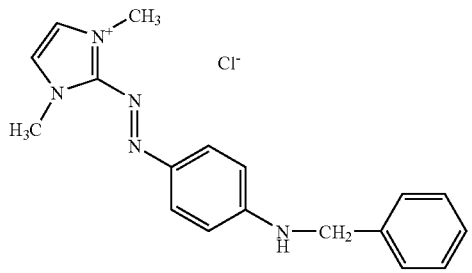

are obtained, in a yield of 80% calculated on the basis of the amount of starting material used.

EXAMPLE 13

200 g of 2-propanol are introduced into a vessel and, under nitrogen, 50 g of 1,3-dimethyl-2-(4'-methoxyphenylazo)-imidazole, having a titre of about 85%, are added at room temperature. With stirring, a viscous mass is formed, which is heated to a temperature of 80° C. (reflux), the mass becoming considerably more fluid. 1 g of sodium methoxide 30% in methanol and ammonia are introduced into the reaction mass. After a maintenance period of a further 3 hours, a further 50 g of the same starting material is added and further ammonia is introduced. The relatively fluid mass is stirred under nitrogen at an internal temperature of 82° C. for a further 34 hours. The conversion is 90%.

At the end of the reaction time, the mixture is cooled to 25° C. in the course of 4 hours. The highly fluid suspension is separated by suction filtration, the filtration residue is thoroughly drained under suction and washed with 45 ml of 2-propanol and drained under suction. The moist filtration residue is slurried in 300 ml of water and stirred at 80° C. for 3 hours. The slurry is then cooled to room temperature and separated by suction filtration. The filtration residue is washed with 100 ml of a 3% sodium chloride solution, thoroughly drained under suction and then dried. About 67 g of the product of formula (IX)

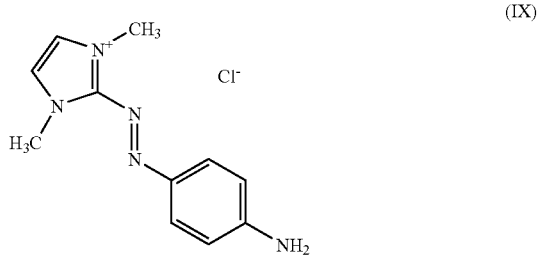

are obtained, in a yield of 73% calculated on the basis of the amount of starting material used.

EXAMPLE 14

200 g of 2-propanol are introduced into a vessel and, under nitrogen, 50 g of 1,3-dimethyl-2-(4'-methoxyphenylazo)-imidazole, having a titre of about 85%, are added at room temperature. With stirring, a viscous mass is formed, which is heated to a temperature of 80° C. (reflux), the mass becoming considerably more fluid. 1 g of sodium methoxide 30% in methanol and dimethylamine are introduced into the reaction mass. After a maintenance period of a further 3 hours, a further 50 g of the same starting material are added and further dimethylamine is introduced. The relatively fluid mass is stirred under nitrogen at an internal temperature of 82° C. for a further 4 hours. The conversion is 95%.

At the end of the reaction time, the mixture is cooled to 25° C. in the course of 4 hours. The highly fluid suspension is separated by suction filtration, the filtration residue is thoroughly drained under suction and washed with 45 ml of 2-propanol and drained under suction.

The moist filtration residue is slurried in 300 ml of water and stirred at 80° C. for 3 hours. Salting-out is then carried out with 30 g of sodium chloride, followed by cooling to room temperature and separation by suction filtration The filtration residue is washed with 100 ml of a 10% sodium chloride solution, thoroughly drained under suction and then dried. About 77 g of the product of formula (X)

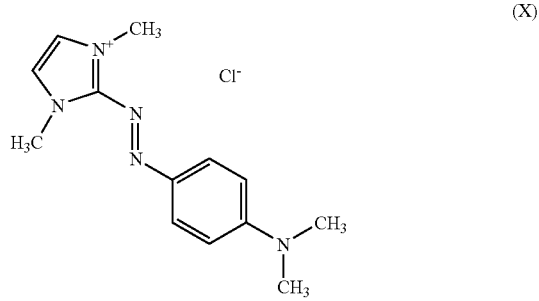

are obtained, in a yield of 83% calculated on the basis of the amount of starting material used.

EXAMPLE 15

53.2 g of 1,3-dimethyl-2-(4'-methoxyphenylazo)-imidazole are slurried in 200 g of methanol at room temperature. The temperature is then raised to 45–50° C. and 10.3 g (90 parts) of 1,6-diamino-hexane are added. 1 g of a 30% solution of sodium methoxide is added. The mixture is stirred for 7 hours. Then the reaction mass is diluted with 140 g of methanol, cooled during 5 hours to room temperature, when crystallization occurs. The crystal suspension is separated by filtration, washed twice with 20 g of isopropanol and dried to yield 50 g of a dark powder of the compound of formula (XI)

APPLICATION EXAMPLE A

A 0.1% solution of the dye of formula (VIII) prepared according to the invention

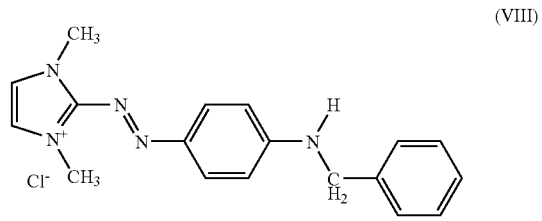

(Example 12) in a surfactant base, consisting of 10% cocoamphoglycinate and 90% water, is applied for 20 minutes to one strand each of bleached and unbleached white human hair ("Italian white virgin" IMHAIR Ltd.), rinsed and shampooed once. Very intense, brilliant scarlet dyeings of identical shade are obtained on both hair qualities. Surprisingly, both the tinctorial strength and the fastness to washing are excellent and very similar on both hair qualities, which testifies to the good levelling capacity of this product.

APPLICATION EXAMPLE B

A 10% solution of a non-ionic surfactant (Plantaren® registered trade mark of the Henkel company) is adjusted to pH 9.5 with citric acid, and 0.06% of the dye of Example 7 prepared according to the invention is dissolved therein. 2 g of the resulting solution are applied to a strand (1 g) of undamaged white human hair ("Italian white Virgin" IMHAIR Ltd.), rinsed and shampooed once. A very intense violet dyeing, which remains clearly visible even after eight hairwashes, is obtained. The dyeing is also very lightfast.

APPLICATION EXAMPLE C

A 10% solution of a non-ionic surfactant (Plantaren® registered trade mark of the Henkel company) is adjusted to pH 5.5 with citric acid. To 100 g of that solution there are added 0.20 g of the dye according to Example 1 of WO 95/01772 (yellow dye) and 0.05 g of the dye of Example 7 prepared according to the invention.

2 g of the resulting solution are applied to a strand (1 g) of undamaged white human hair ("Italian white virgin" IMHAIR Ltd.), rinsed and shampooed once. A very intense copper-coloured dyeing is obtained, which is distinguished by excellent fastness to washing, to rubbing and to light.

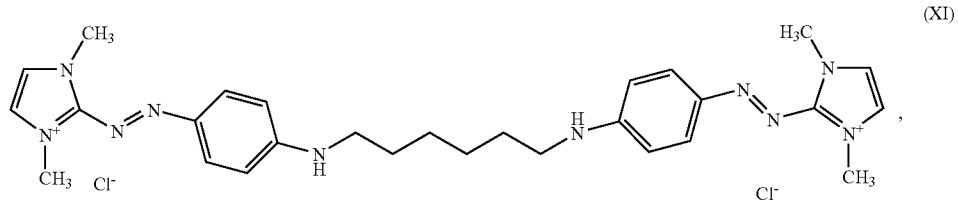

which is used as such in tinctorial applications.

APPLICATION EXAMPLE D

A 10% solution of a non-Ionic surfactant (Plantaren® registered trade mark of the Henkel company) is adjusted to pH 5.5 with citric acid. To 100 g of that solution there are added 0.25 g of the dye according to Example 1 from WO 95/01772 (yellow dye), 0.08 g of the dye according to Example 46 of WO 95/01772 (orange dye) and 0.11 g of the dye of Example 1 prepared according to the invention.

4 g of the resulting solution are applied to a strand (1 g) of bleached human hair, rinsed and shampooed once. A very intense black dyeing is obtained, which is distinguished by excellent fastness to washing and to rubbing.

What is claimed is:

1. A process for the preparation of an azo compound of formula (I)

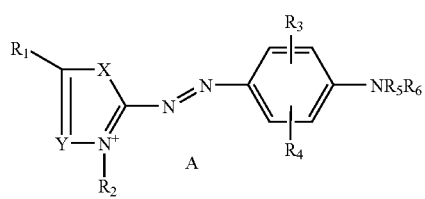

wherein

X is —O— or —$NR_7$—,

Y is —N═ or —$CR_8$═,

A is a colourless anion, $R_1$ and $R_8$ each independently of the other are hydrogen; $C_1$–$C_4$alkyl; $C_1$–$C_4$alkyl substituted by —OH, —$C_1$–$C_4$alkoxy, halogen, —CN or by phenyl; halogen or nitro, $R_2$ and $R_7$ each independently of the other are hydrogen; unsubstituted $C_1$–$C_4$alkyl or $C_1$–$C_4$alkyl substituted by —OH, $C_1$–$C_4$alkoxy, halogen, —CN or by phenyl, $R_3$ and $R_4$ each independently of the other are hydrogen; unsubstituted $C_1$–$C_4$alkyl; $C_1$–$C_4$alkyl substituted by —OH, —$C_1$–$C_4$alkoxy, halogen, —CN or by phenyl; unsubstituted $C_1$–$C_{12}$alkoxy; $C_1$–$C_{12}$alkoxy substituted by —OH, —$C_1$–$C_4$alkoxy, halogen, —CN or by phenyl; or halogen, $R_5$ is hydrogen; unsubstituted $C_{1-4}$alkyl; or $C_1$–$C_4$alkyl substituted by —OH, —$C_1$–$C_4$alkoxy, halogen, —CN or by phenyl, $R_6$ is hydrogen; unsubstituted $C_{1-4}$alkyl; $C_1$–$C_4$alkyl substituted by —OH, —$C_1$–$C_4$alkoxy, halogen, —CN or by phenyl; or a radical of formula (a) or (b)

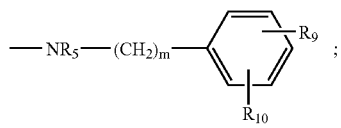

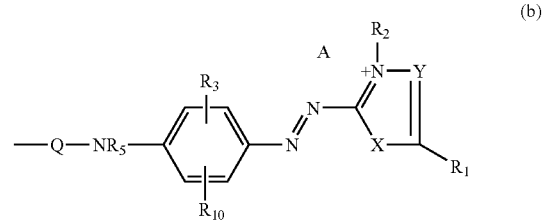

wherein

X, Y, A, $R_1$, $R_2$, $R_3$, $R_4$ and $R_5$ are as defined above, and $R_9$ and $R_{10}$ each independently of the other are hydrogen; unsubstituted $C_1$–$C_4$alkyl; $C_1$–$C_4$alkyl substituted by —OH, —$C_1$–$C_4$alkoxy, halogen, —CN or by phenyl; —$OR_{11}$; —$NR_{11}R_{12}$ or —$NR_{11}COR_{12}$, wherein $R_{11}$ and $R_{12}$ each independently of the other are hydrogen; —$NH_2$; unsubstituted $C_1$–$C_{12}$alkyl or $C_1$–$C_{12}$alkyl substituted by —OH, —$C_1$–$C_4$alkoxy, halogen, —CN or by phenyl, Q is a bridging member, and m is 0 or 1, or $R_5$ and $R_6$ together with the nitrogen atom to which they are bonded form a pyrrolidine, piperidine, morpholine or piperazine ring, by reaction of a compound of formula (II) or a mixture of compounds of formula (II)

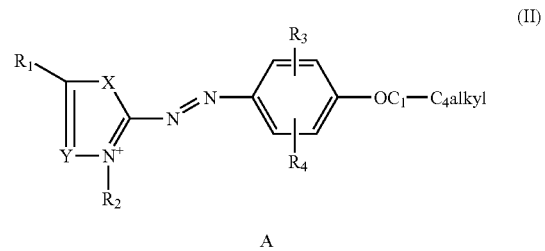

with a compound of formula (III) or with a mixture of compounds of formula (III)

$NHR_5R_6$      (III), wherein all the substituents are as defined above, in an inert solvent or solvent mixture, which process comprises adding to the reaction mixture at least one tertiary amine and/or at least one alcoholate of the formula $R_{13}$O-Z, wherein $R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and Z is an alkali metal.

2. A process according to claim 1, wherein

X is —$NR_7$—,

Y is —$CR_8$═,

A is a colourless anion, $R_1$ and $R_8$ each independently of the other are hydrogen or unsubstituted $C_1$–$C_2$alkyl, $R_2$ and $R_7$ each independently of the other are unsubstituted $C_1$–$C_2$alkyl or hydroxyethyl, $R_3$ and $R_4$ each independently of the other are hydrogen; methyl; methoxy or chlorine, $R_5$ is hydrogen; methyl or ethyl, $R_6$ is hydrogen; methyl; ethyl, or a radical of formula (a) or (b)

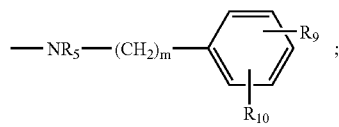

(a)

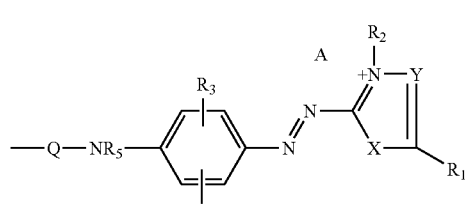

(b)

wherein X, Y, A, $R_1$, $R_2$, $R_3$, $R_4$ and $R_5$ have the meanings given above, and $R_9$ and $R_{10}$ each independently of the other are hydrogen; unsubstituted $C_1$–$C_4$alkyl; $C_1$–$C_4$alkyl substituted by —OH, —$C_1$–$C_4$alkoxy, halogen, —CN or by phenyl; —$OR_{11}$; —$NR_{11}R_{12}$ or —$NR_{11}COR_{12}$, wherein $R_{11}$ and $R_{12}$ each independently of the other are hydrogen; —$NH_2$; unsubstituted $C_1$–$C_{12}$alkyl or $C_1$–$C_{12}$alkyl substituted by —OH, —$C_1$–$C_4$alkoxy, halogen, —CN or by phenyl, Q is unsubstituted $C_2$–$C_{10}$alkylene or $C_2$–$C_{10}$alkylene substituted by —OH, —$C_1$–$C_4$alkoxy, halogen, —CN or by phenyl, and m is 0 or 1.

3. A process according to claim 1 for the preparation of an azo compound of formula (Ia)

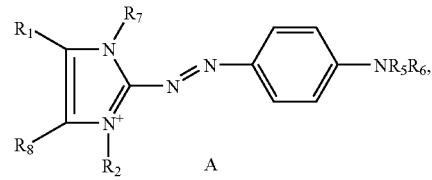

(Ia)

wherein $R_1$ and $R_8$ each independently of the other are hydrogen or methyl, $R_2$ and $R_7$ each independently of the other are methyl or ethyl, $R_5$ and $R_6$ each independently of the other are hydrogen; methyl or ethyl and A is a colourless anion.

4. A process according to claim 1 for the preparation of an azo compound of formula (Ib)

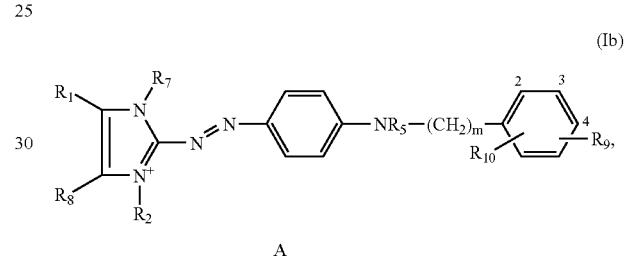

(Ib)

wherein $R_1$ and $R_8$ each independently of the other are hydrogen or methyl, $R_2$ and $R_7$ each independently of the other are methyl or ethyl, $R_5$ is hydrogen or methyl, $R_9$ is hydrogen or methyl, $R_{10}$ is hydrogen; methoxy; ethoxy; —$NH_2$; —NHCOH; —$NHCOCH_3$; —$NHCOCH_2CH_3$ or —$NHCONH_2$, and $R_{10}$ is in the 4-position, m is 0 or 1 and A is a colourless anion.

5. A process according to claim 1 for the preparation of an azo compound of formula (Ic)

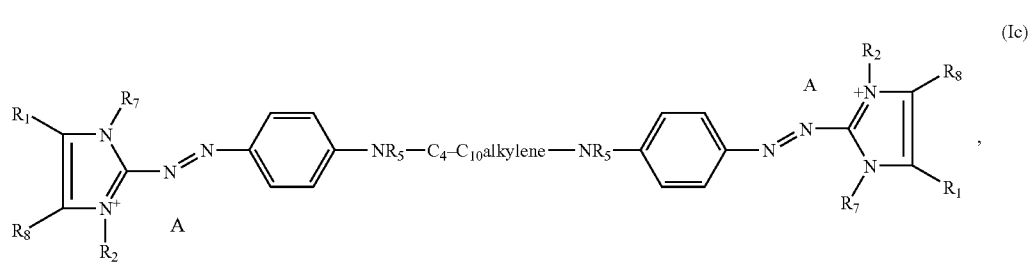

(Ic)

wherein
- R₁ and R₈ each independently of the other are hydrogen or methyl,
- R₂ and R₇ each independently of the other are methyl or ethyl,
- each R₅ independently of the other is hydrogen or methyl, and
- each A independently of the other is a colourless anion.

6. A process according to claim 1, wherein there are used from 0.5 to 200 parts of at least one tertiary amine and/or at least one alcoholate of the formula $R_{13}O$-$Z$, wherein $R_{13}$ and $Z$ are as defined in claim 1.

7. A process according to claim 1, wherein there is used at least one tertiary amine of the following formulae (c)-(i)

NR₁₄R₁₅R₁₆;                                          (c)

                                 (d)

                                 (e)

                                 (f)

                                 (g)

R₁₇—N(CR₁₈R₁₉)ₙ  and                                 (h)

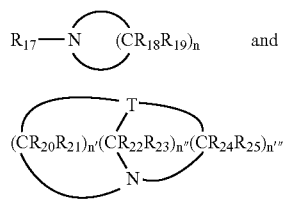                                 (i)

wherein
- R₁₄, R₁₅ and R₁₆ each independently of the others are unsubstituted $C_1$–$C_{10}$alkyl or substituted $C_1$–$C_{10}$alkyl,
- R₁₇ is unsubstituted $C_1$–$C_4$alkyl or $C_1$–$C_4$alkyl substituted by —OH, —$C_1$–$C_4$alkoxy, halogen, —CN or by phenyl,
- R₁₈, R₁₉, R₂₀, R₂₁, R₂₂, R₂₃, R₂₄ and R₂₅ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl,
- T is N or CH,
- n is 4, 5 or 6 and
- n', n" and n'" each independently of the others are 1, 2, 3 or 4.

8. A process according to claim 1, wherein there is used at least one alcoholate of the formula $R_{13}O$-$Z$, wherein
- R₁₃ is unsubstituted $C_1$–$C_4$alkyl or $C_1$–$C_4$alkyl substituted by —OH, —$C_1$–$C_4$alkoxy, halogen, —CN or by phenyl, and
- Z is an alkali metal.

9. A process according to claim 1, wherein water; a $C_{1-8}$alcohol; an alkyl nitrile; a dialkylformamide and/or a sulfoxide is used as solvent.

10. A process according to claim 1, wherein the process is carried out at a temperature of from 40 to 140° C.

11. A process according to claim 1 for the preparation of a compound of formula (Ia)

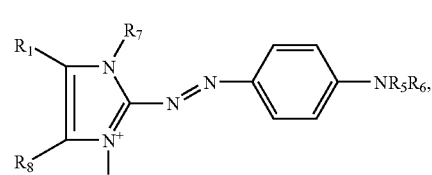                                 (Ia)

wherein
- R₁ and R₈ each independently of the other are hydrogen or methyl,
- R₂ and R₇ each independently of the other are methyl or ethyl,
- R₅ and R₆ each independently of the other are hydrogen; methyl or ethyl and
- A is a colourless anion, by reaction of a compound of formula (IIa) or a mixture of compounds of formula (IIa)

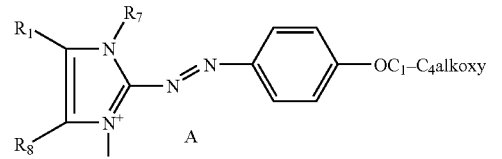                                 (IIa)

with a compound of formula (III) or with a mixture of compounds of formula (III)

NHR₅R₆                                              (III), wherein all the substituents have the meanings given above,
in a protic or
polar aprotic solvent, optionally under an inert atmosphere,
at a temperature of from 40 to 140° C,
which process comprises adding from 0.5 to 200 parts, of at least one amine of one of formulae (c)-(i)

NR₁₄R₁₅R₁₆;                                          (c)

                                 (d)

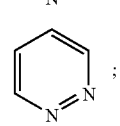                                 (e)

-continued

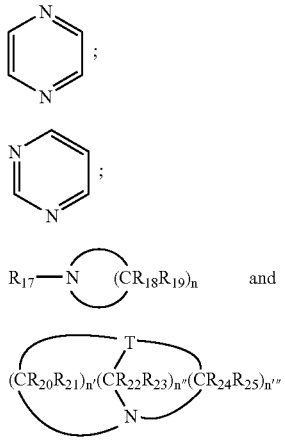

and/or at least one alcoholate of the formula $R_{13}$O-Z, wherein
$R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and
Z is an alkali metal,
$R_{14}$, $R_{15}$ and $R_{16}$ each independently of the others are unsubstituted $C_1$–$C_{10}$alkyl or $C_1$–$C_{10}$alkyl substituted by —OH, —$C_1$–$C_4$alkoxy, halogen, —CN or by phenyl,
$R_{17}$ is unsubstituted $C_1$–$C_4$alkyl or $C_1$–$C_4$alkyl substituted by —OH, —$C_1$–$C_4$alkoxy, halogen, —CN or by phenyl,
$R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl; T is N or OH,
n is 4, 5 or 6, and
n', n" and n'" each independently of the others are 1, 2, 3 or 4.

12. A process according to claim 1 for the preparation of a compound of formula (Ib)

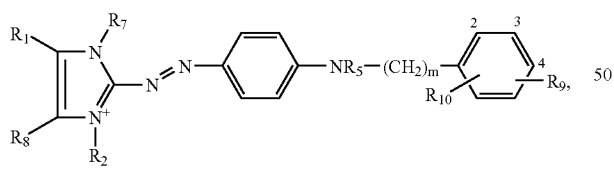

wherein
$R_1$ and $R_8$ each independently of the other are hydrogen or methyl,
$R_2$ and $R_7$ each independently of the other are methyl or ethyl,
$R_5$ is hydrogen or methyl,
$R_9$ is hydrogen or methyl,
$R_{10}$ is hydrogen; methoxy; ethoxy; —NH$_2$; —NHCOH; —NHCOCH$_3$; —NHCOCH$_2$CH$_3$ or —NHCONH$_2$; and $R_{10}$ is in the 4-position,
m is 0 or 1 and A is a colourless anion,
by reaction of a compound of formula (IIb) or a mixture of compounds of formula (IIb)

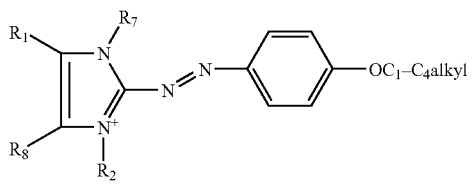

with a compound of formula (IIIb) or with a mixture of compounds of formula (IIIb)

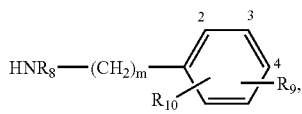

wherein all the substituents have the definitions and meanings given above,
in a protic or a polar aprotic solvent, optionally under an inert atmosphere, at a temperature of from 40 to 140° C., which process comprises adding from 0.5 to 200 parts of at least one amine of one of formulae (c)-(i)

NR$_{14}$R$_{15}$R$_{16}$;  (c)

  (d)

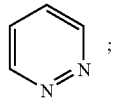  (e)

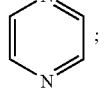  (f)

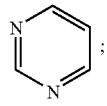  (g)

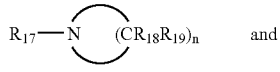  (h)

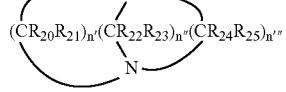  (i)

and/or at least one alcoholate of the formula $R_{13}O\text{-}Z$, wherein
$R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and
Z is an alkali metal,
$R_{14}$, $R_{15}$ and $R_{16}$ each independently of the others are unsubstituted $C_1$–$C_{10}$alkyl or $C_1$–$C_{10}$alkyl substituted by —OH, —$C_1$–$C_4$alkoxy, halogen, —CN or by phenyl,
$R_{17}$ is unsubstituted $C_1$–$C_4$alkyl or $C_1$–$C_4$alkyl substituted by —OH, —$C_1$–$C_4$alkoxy, halogen, —CN or by phenyl,
$R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl;
T is N or CH,
n is 4, 5 or 6, and
n', n" and n'" each independently of the others are 1, 2, 3 or 4.

13. A process according to claim 1 for the preparation of a compound of formula (Ic)

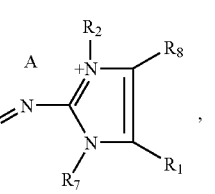  (Ic)

wherein
$R_1$ and $R_8$ each independently of the other are hydrogen or methyl,
$R_2$ and $R_7$ each independently of the other are methyl or ethyl,
each $R_5$ independently of the other is hydrogen or methyl,
each A independently of the other is a colourless anion,
by reaction of a compound of formula (IIc) or a mixture of compounds of formula (IIc)

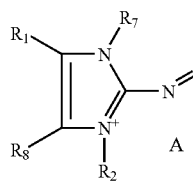  (IIc)

with a compound of formula (IIIc) or with a mixture of compounds of formula (IIIc)

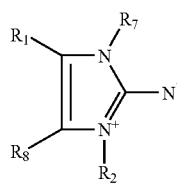  (IIIc)

wherein all the substituents have the definitions and meanings given above,
in a protic or a polar aprotic solvent,
optionally under an inert atmosphere,
at a temperature of from 40 to 140° C.,
which process comprises adding from 0.5 to 200 parts of at least one amine of one of formulae (c)-(i), $NR_{14}R_{15}R_{16}$;  (c)

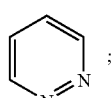  (d)

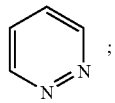  (e)

-continued

  (f)

  (g)

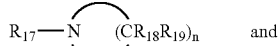  (h)

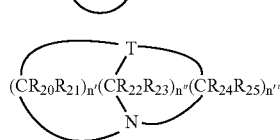  (i)

and/or at least one alcoholate of the formula $R_{13}O\text{-}Z$, wherein
$R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and
Z is an alkali metal,
$R_{14}$, $R_{15}$ and $R_{16}$ each independently of the others are unsubstituted $C_1$–$C_{10}$alkyl or $C_1$–$C_{10}$alkyl substituted by —OH, —$C_1$–$C_4$alkoxy, halogen, —CN or by phenyl, $R_{17}$ is unsubstituted $C_1$–$C_4$alkyl or $C_1$–$C_4$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen; unsubstituted $C_1$–$C_4$alkyl or $C_1$–$C_4$alkyl substituted by —OH, —$C_1$–$C_4$alkoxy, halogen, —CN or by phenyl;

T is N or CH, n is 4, 5 or 6, and n', n" and n''' each independently of the others are 1, 2, 3 or 4.

14. A process according to claim 11 for the preparation of a compound of formula (Ia)

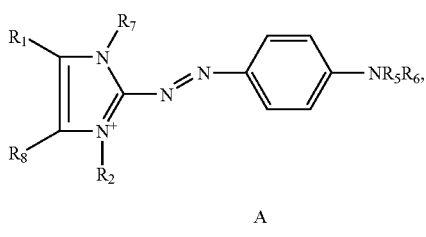

(Ia)

wherein $R_1$ and $R_8$ each independently of the other are hydrogen or methyl, $R_2$ and $R_7$ each independently of the other are methyl or ethyl, $R_5$ and $R_6$ each independently of the other are hydrogen; methyl or ethyl and A is a colourless anion, by reaction of a compound of formula (IIa) or a mixture of compounds of formula (IIa)

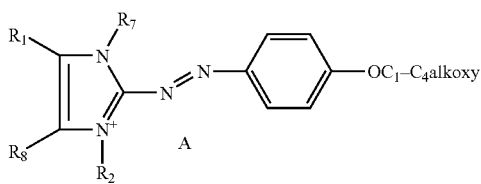

(IIa)

with a compound of formula (III) or with a mixture of compounds of formula (III)

 (III), wherein all the substituents have the meanings given above, in water or in methanol, ethanol, isopropanol, propanol, 2-propanol, butanol, an alkyl nitrile, a di-$C_1$–$C_2$alkylformamide, a di-$C_1$–$C_2$alkylacetamide; an N-alkylpyrrolidone, or dimethyl sulfoxide, optionally under a nitrogen atmosphere, at a temperature of from 50 to 120° C., which process comprises adding from 1 to 100 parts, of at least one amine of one of formulae (c)-(i)

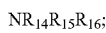 (c)

 (d)

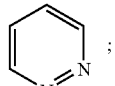 (e)

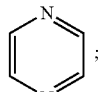 (f)

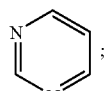 (g)

 (h)

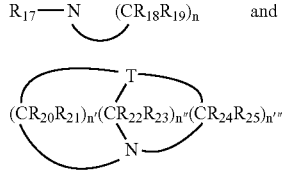 (i)

and/or at least one alcoholate of the formula $R_{13}$O-Z, wherein $R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and Z is an alkali metal, $R_{14}$, $R_{15}$ and $R_{16}$ each independently of the others are unsubstituted $C_1$–$C_8$alkyl or $C_1$–$C_8$alkyl substituted by —OH, —$C_1$–$C_4$alkoxy, halogen, —CN or by phenyl, $R_{17}$ is unsubstituted $C_1$–$C_2$alkyl or $C_1$–$C_2$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others are hydrogen, unsubstituted $C_1$–$C_2$alkyl or $C_1$–$C_2$alkyl substituted by —OH, —$C_1$–$C_4$alkoxy, halogen, —CN or by phenyl, T is N or CH, n is 5 or 6, and n', n" and n''' each independently of the others are 1 2 or 3.

15. process according to claim 12 for the preparation of a compound of formula (Ib)

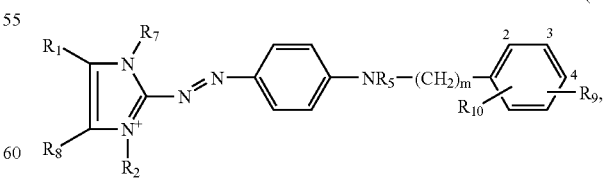

(Ib)

wherein $R_1$ and $R_8$ each independently of the other are hydrogen or methyl, $R_2$ and $R_7$ each independently of the other are methyl or ethyl, $R_5$ is hydrogen or methyl, $R_9$ is hydrogen or methyl, $R_{10}$ is hydrogen; methoxy; ethoxy; —$NH_2$; —NHCOH; —$NHCOCH_3$; —$NHCOCH_2CH_3$ or —$NHCONH_2$, and $R_{10}$ is in the 4-position, m is 0 or 1 and A is a colourless anion, by reaction of a compound of formula (IIb) or a mixture of compounds of formula (IIb)

(IIb)

$R_1$, $R_7$, $R_8$, $R_2$, A — imidazolium-azo-phenyl-$OC_1$–$C_4$alkyl structure with a compound of formula (IIIb) or with a mixture of compounds of formula (IIIb)

(IIIb)

$HNR_8$—$(CH_2)_m$—phenyl with $R_{10}$, $R_9$ substituents wherein all the substituents have the definitions and meanings given above, in water or in methanol, ethanol, isopropanol, propanol, 2-propanol, butanol, acetonitrile, propionitrile, a di-$C_1$–$C_2$alkylformamide, a di-$C_1$–$C_2$alkylacetamide, an N-alkylpyrrolidone or dimethyl sulfoxide, optionally under a nitrogen atmosphere, at a temperature of from 50 to 120° C., which process comprises adding from 1 to 100 parts of at least one amine of one of formulae (c)-(i)

$NR_{14}R_{15}R_{16}$;   (c)

(d) pyridine;

(e) pyridazine;

(f) pyrazine;

(g) pyrimidine;

(h) $R_{17}$—N—$(CR_{18}R_{19})_n$ ring and (i) ring with T, $(CR_{20}R_{21})_{n'}(CR_{22}R_{23})_{n''}(CR_{24}R_{25})_{n'''}$, N and/or at least one alcoholate of the formula $R_{13}$O-Z, wherein $R_{13}$ is unsubstituted $C_1$–$C_{10}$alkyl or $C_1$–$C_{10}$alkyl substituted by —OH, —$C_1$–$C_4$alkoxy, halogen, —CN or by phenyl, and Z is an alkali metal, $R_{14}$, $R_{15}$ and $R_{16}$ each independently of the others are unsubstituted $C_1$–$C_8$alkyl or $C_1$–$C_8$alkyl substituted by —OH, —$C_1$–$C_4$alkoxy, halogen, —CN or by phenyl, $R_{17}$ is unsubstituted $C_1$–$C_2$alkyl or $C_1$–$C_2$alkyl substituted by —OH, —$C_1$–$C_4$alkoxy, halogen, —CN or by phenyl, $R_{18}$, $R_{19}$, $R_{20}$, $R_{21}$, $R_{22}$, $R_{23}$, $R_{24}$ and $R_{25}$ each independently of the others hydrogen, unsubstituted $C_1$–$C_2$alkyl or $C_1$–$C_2$alkyl substituted by —OH, —$C_1$–$C_4$alkoxy, halogen, —CN or by phenyl, T is N or CH, n is 5 or 6, and n', n" and n'" each independently of the others are 2 or 3.

16. A process according to claim 1 for the preparation of a compound of formula (Ic)

(Ic)

$R_1$, $R_7$, $R_8$, $R_2$, A — imidazolium-azo-phenyl-$NR_5$—$C_4$–$C_{10}$alkylene—$NR_5$—phenyl-azo-imidazolium — $R_2$, $R_8$, $R_1$, $R_7$, A wherein
R$_1$ and R$_8$ each independently of the other are hydrogen or methyl,
R$_2$ and R$_7$ each independently of the other are methyl or ethyl,
each R$_5$ independently of the other is hydrogen or methyl,
each A independently of the other is a colourless anion.
by reaction of a compound of formula (IIc) or a mixture of compounds of formula (IIc)

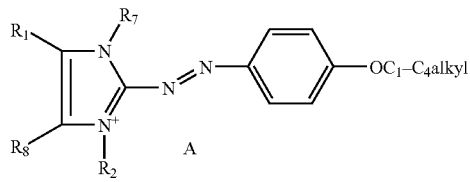
(IIc)

with a compound of formula (IIIc) or with a mixture of compounds of formula (IIIc)

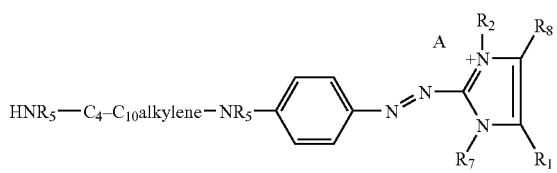
(IIIc)

wherein all the substituents have the definitions and meanings given above,
in water, methanol, ethanol, isopropanol, propanol, 2-propanol, butanol, acetonitrile, propionitrile, a di-C$_1$–C$_2$alkylformamide, a di-C$_1$–C$_2$alkylacetamide; an N-alkylpyrrolidone or in dimethyl sulfoxide, optionally under a nitrogen atmosphere,
at a temperature of from 50 to 120° C.,
which process comprises adding from 1 to 100 parts of at least one amine of one of formulae (c)-(i), NR$_{14}$R$_{15}$R$_{16}$; (c)

 (d)

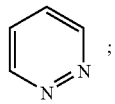 (e)

 (f)

 (g)

 (h)

R$_{17}$—N  (CR$_{18}$R$_{19}$)$_n$   and

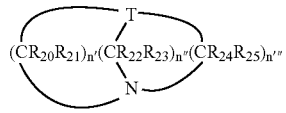 (i)

(CR$_{20}$R$_{21}$)$_{n'}$(CR$_{22}$R$_{23}$)$_{n''}$(CR$_{24}$R$_{25}$)$_{n'''}$ and/or at least one alcoholate of the formula R$_{13}$O-Z,
wherein
R$_{13}$ is unsubstituted C$_1$–C$_{10}$alkyl or C$_1$–C$_{10}$alkyl substituted by —OH, —C$_1$–C$_4$alkoxy, halogen, —CN or by phenyl, and
Z is an alkali metal,
R$_{14}$, R$_{15}$ and R$_{16}$ each independently of the others are unsubstituted C$_1$–C$_8$alkyl or C$_1$–C$_8$alkyl substituted by —OH, —C$_1$–C$_4$alkoxy, halogen, —CN or by phenyl,
R$_{17}$ is unsubstituted C$_1$–C$_2$alkyl or —C$_1$–C$_2$alkyl substituted by —OH, —C$_1$–C$_4$alkoxy, halogen, —CN or by phenyl,
R$_{18}$, R$_{19}$, R$_{20}$, R$_{21}$, R$_{22}$, R$_{23}$, R$_{24}$ and R$_{25}$ each independently of the others are hydrogen, unsubstituted C$_1$–C$_2$alkyl or C$_1$–C$_2$alkyl substituted by —OH, —C$_1$–C$_4$alkoxy, halogen, —CN or by phenyl,
T is N or CH,
n is 5 or 6, and
n', n" and n'" each independently of the others are 2 or 3.

* * * * *